I. B. SANDUSKY.
Grain-Drill Teeth.

No. 161,445.  Patented March 30, 1875.

WITNESSES:  
A. W. Almquist  
A. F. Terry

INVENTOR:  
Isaac B. Sandusky  
BY  
ATTORNEYS.

THE GRAPHIC CO.PHOTO-LITH.39 & 41 PARK PLACE,N.Y.

UNITED STATES PATENT OFFICE.

ISAAC B. SANDUSKY, OF LEXINGTON, KENTUCKY.

IMPROVEMENT IN GRAIN-DRILL TEETH.

Specification forming part of Letters Patent No. 161,445, dated March 30, 1875; application filed February 20, 1875.

*To all whom it may concern:*

Figure 1:
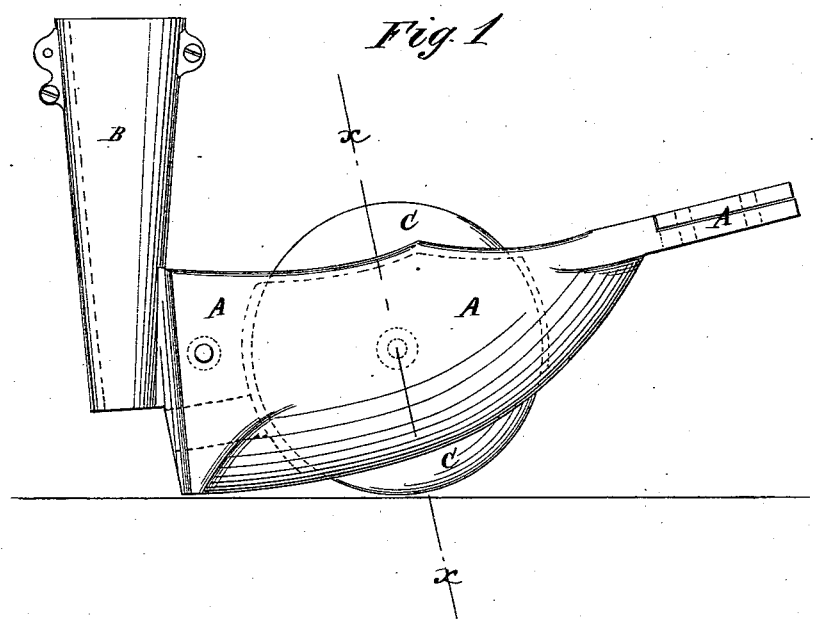
Figure 2:
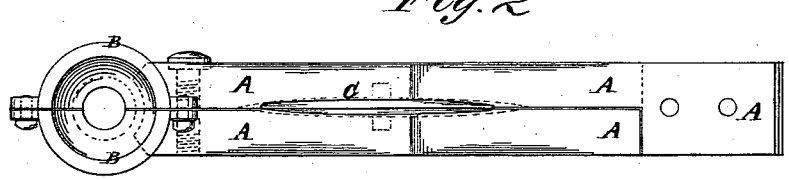
Figure 3:
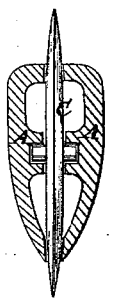

Be it known that I, ISAAC B. SANDUSKY, of Lexington, in the county of Fayette and State of Kentucky, have invented a new and useful Improvement in Grain-Drill Tooth, of which the following is a specification:

Figure 1 is a side view of my improved grain-drill tooth. Fig. 2 is a top view of the same. Fig. 3 is a cross-section of the same, taken through the line $x\ x$, Fig. 1.

Similar letters of reference indicate corresponding parts.

Revolving cutter-wheels for dividing vines, weeds, &c., have been heretofore combined with the teeth of grain-drills. This invention consists in the construction of the drill-tooth and seed-spout in two corresponding parts, which, when secured together, furnish bearings for a cutter-wheel (that revolves between them and enters the ground in advance of the tooth,) as hereinafter described.

A is the tooth, which is made in two equal parts or halves, and B is the conductor-spout to conduct the seed into the furrow opened by the tooth A, and which is also made in two equal parts or halves. Each half of the tooth A and each corresponding half of the spout B are formed in one piece. The rear parts of the tooth A are secured to each other by a screw or bolt. The forward ends of the tooth A are so formed as to overlap each other, so as to be held together by the bolts that secure the forward end of the tooth to the frame of the drill. The parts of the spout B have lugs formed upon their adjacent edges, to receive screws or bolts for securing said parts to each other. The inner faces of the middle parts of the halves of the tooth A are recessed to receive a cutter, C, the lower part of which projects below the tooth A, to cut off any weeds, grass, or other rubbish that might choke or clog the covering-hoes of the drill. The cutter C may be a rotary cutter, as shown in Figs. 1, 2, and 3, and this form I prefer; or it may be a stationary cutter, as may be desired. From the recess in which the cutter C is placed a channel in the adjacent halves of the tooth A leads out to the rear end of the said tooth A, just below the lower end of the spout B, as shown in dotted lines in Fig. 1, to allow any soil to escape that may be carried into said recess by said cutter C.

Having thus described my invention, I claim as new and desire to secure by Letters Patent—

The tooth A and conductor-spout B, made in halves, recessed to receive the cutter-wheel, and provided with bearings therefor, all as shown and described.

ISAAC B. SANDUSKY.

Witnesses:
   J. F. McCLURE,
   CHARLES C. MOORE.